Aug. 30, 1966
C. P. G. RIOUX
MACHINES AND METHODS FOR PRODUCING VERY HIGH INTENSITY ELECTRIC CURRENTS
Filed March 15, 1963
3,270,228
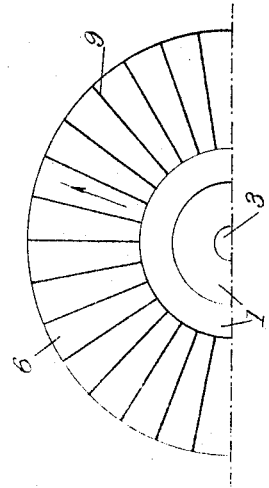
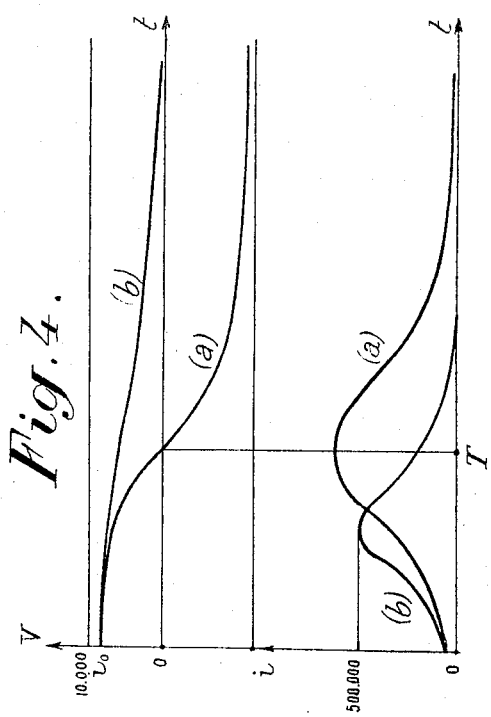
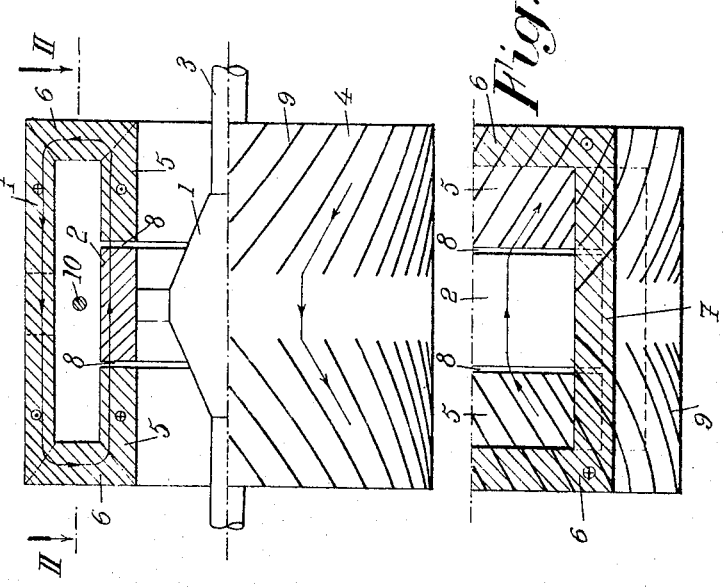

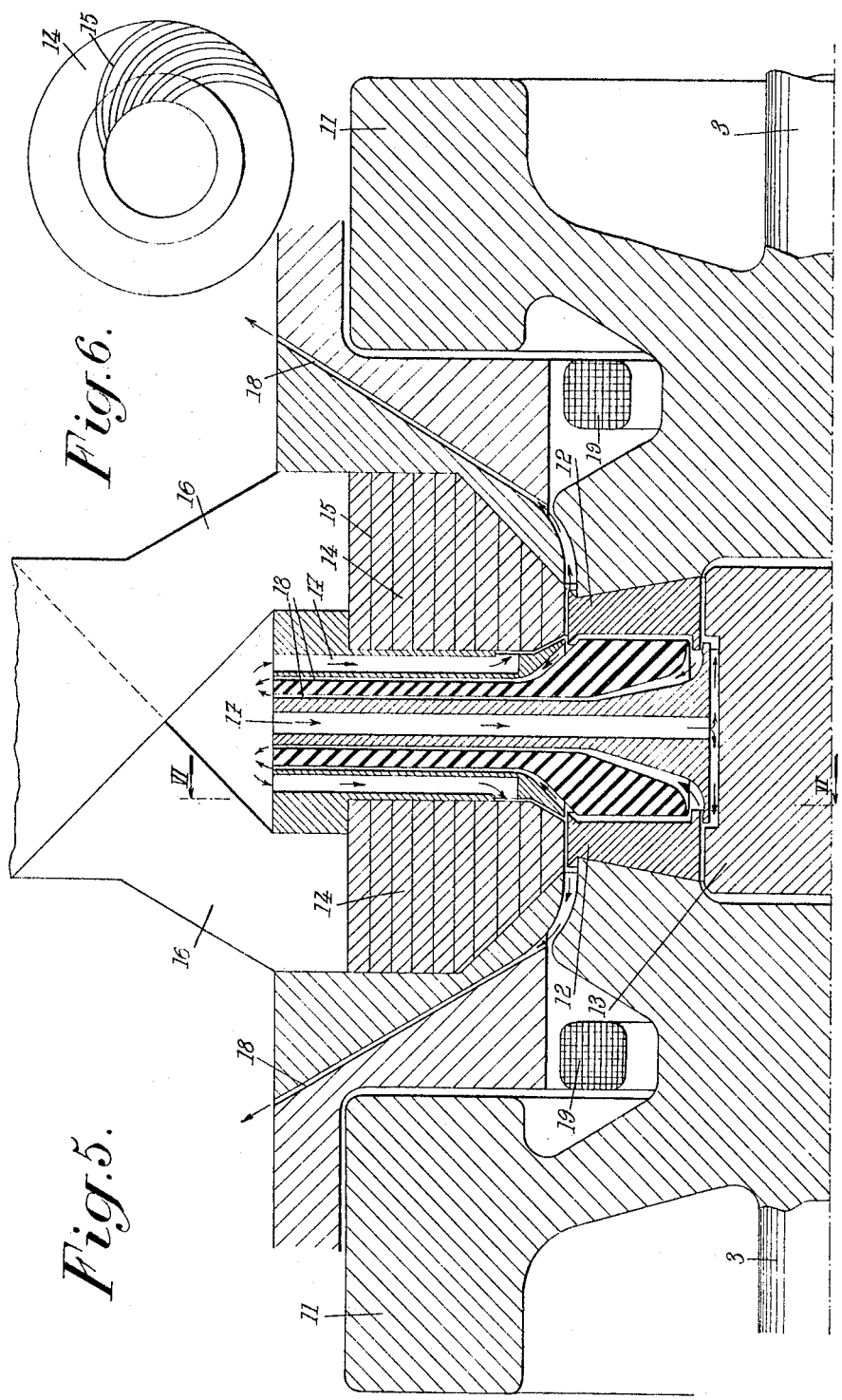

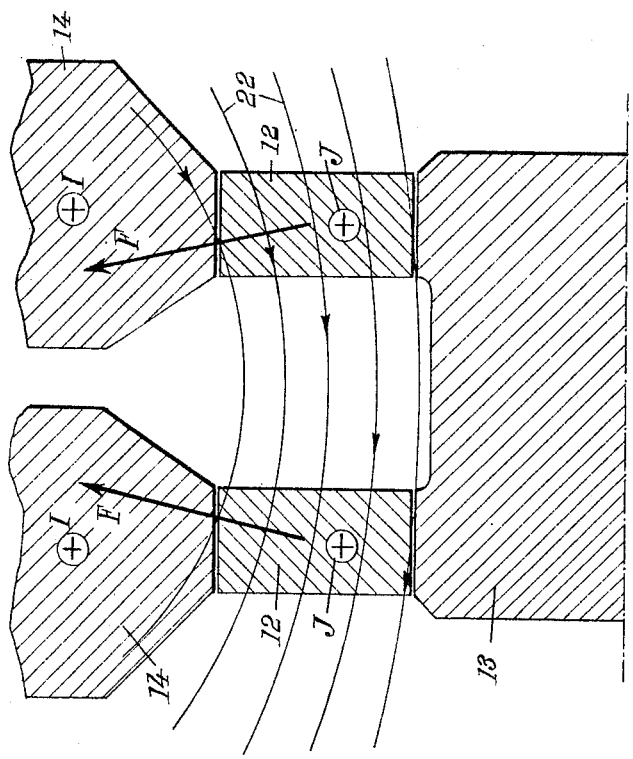
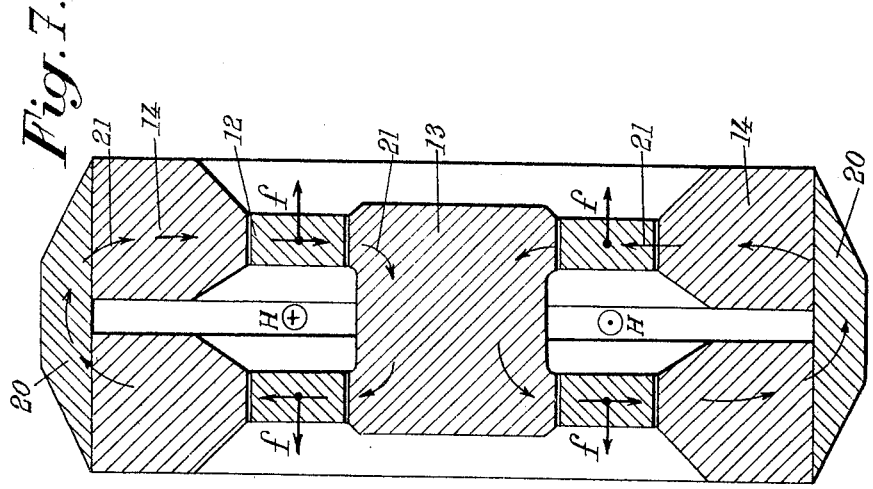

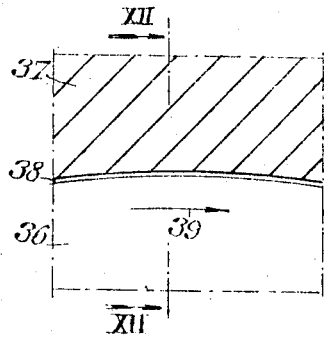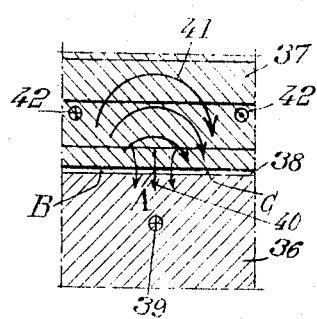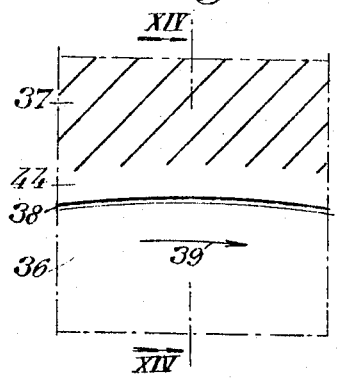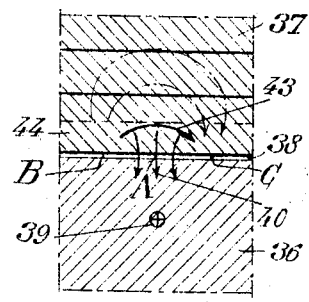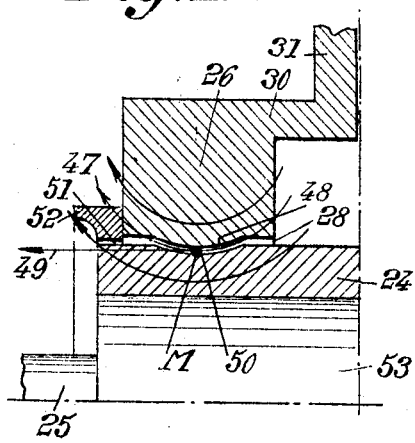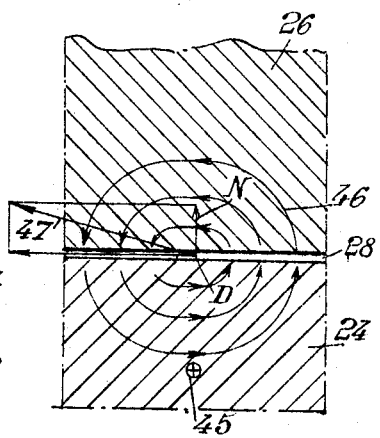

United States Patent Office 3,270,228
Patented August 30, 1966

3,270,228
MACHINES AND METHODS FOR PRODUCING VERY HIGH INTENSITY ELECTRIC CURRENTS
Christian Paul Gilbert Rioux, Epinay-sur-Seine, France, assignor to Centre National de la Recherche Scientifique, Paris, Seine, France, a French government administration
Filed Mar. 15, 1963, Ser. No. 265,494
Claims priority, application France, Mar. 19, 1962, 891,483
20 Claims. (Cl. 310—178)

The present invention relates to machines and methods for producing electric currents of very high intensity, in particular in order to create very intensive magnetic fields such as those necessary for producing plasma.

The object of the present invention is to provide a machine and a method which are better adapted to meet the requirements of practice than those known up to this time.

According to the present invention, the machine comprises, in combination, a rotor, said rotor comprising a high inertia mass and an electricity conducting mass, said electricity conducting mass having two surfaces of revolution about the axis of said rotor, a stator comprising an electricity conducting mass shaped to have two surfaces of revolution about the same axis, each opposite one of said surfaces of revolution of said electricity conducting mass of said rotor, respectively, each of said stator surfaces being separated from the corresponding rotor surface located opposite it by a narrow gap, said electricity conducting mass of said stator being at least partly laminated so that the machine is a self exciting one, means for gradually rotating said rotor at high speed and means for injecting a conductor liquid into said gaps in such manner as to connect in series the conducting masses of said stator and of said rotor.

The method according to the present invention consists in driving the rotor at high speed, then in injecting simultaneously in said gaps an electricity conducting liquid, which short-circuits the electricity conducting masses of the stator and of the rotor and transforms the kinetic energy stored up in the rotor into an electric current pulse of very high amplitude flowing through the circuit consisting of the whole of said masses and possibly an external circuit element.

Preferred embodiments of the invention will be hereinafter described with reference to the appended drawings, given merely by way of example, and in which:

FIG. 1 diagrammatically shows, in axial section for the upper half and in elevational view for the lower half, a current generating machine according to a first embodiment of the invention;

FIG. 2 is a half section on the line II—II of FIG. 1;

FIG. 3 is a half end view;

FIG. 4 shows curves illustrating the operation of the machine;

FIG. 5 is a half sectional view through the axis of a current generating machine made according to a second embodiment of the invention;

FIG. 6 is a cross sectional view on the line VI—VI of FIG. 5;

FIGS. 7 and 8 are diagrammatic partial axial sections of the machine of FIG. 5;

FIGS. 11 to 14 are comparative views illustrating the interest of eliminating the lamination in the zone of the stator adjacent to the gap;

FIG. 15 is a view on an enlarged scale, of a portion of FIG. 9;

FIG. 16 is a diagram for explaining the interest of one of the features of the invention.

Figure 9:
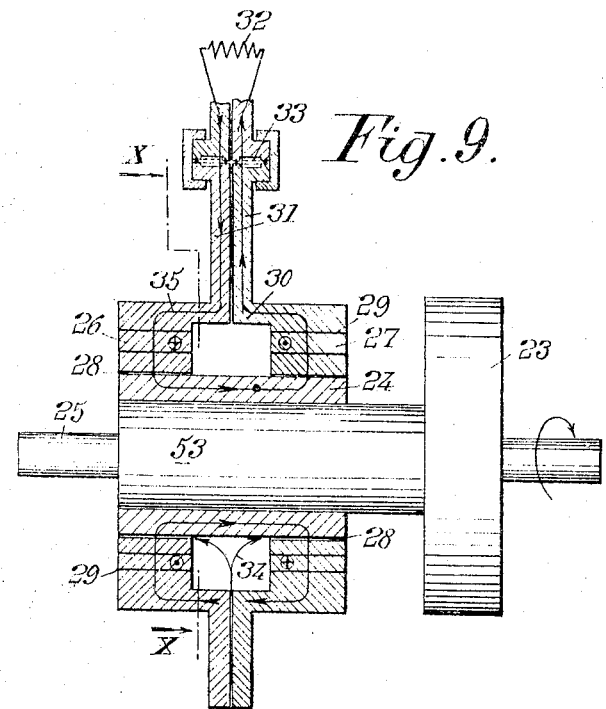
FIG. 9 is an axial sectional view, on the line IX—IX of FIG. 10, of still another embodiment of a machine made according to the invention.

In order to create current pulses of very high intensity according to the present invention the following features are applied:

Use is made of a dynamo comprising a stator and a rotor the active masses of which, that is to say the masses through which current is flowing, are separated from each other by two annular spaces which will be hereinafter called "gaps."

The rotor is given a high inertia, for instance by making it rigid with a very heavy fly-wheel, and the electricity conducting mass of the stator is laminated so that when current flows therethrough it creates a field capable of exerting a torque on the rotor, through which a current is flowing as it will be hereinafter explained (self-excitation arrangement).

The laminated arrangement must be such that the corresponding number of ampere-turns produces, when the dynamo is in operation, an electromotive force greater than the internal and external voltage loss, even when the ferro-magnetic materials which may be present therein are saturated, so that the electric current that is generated can increase up to a very high value.

As a matter of fact, said self-exciting laminated structure makes it unnecessary to provide ferro-magnetic materials along the path of the lines of force. The active masses of the rotor and of the stator may therefore be made at least mostly of copper, or a copper alloy more resistant mechanically than copper, such as beryllium bronze.

This absence of ferro-magnetic materials constitutes an important advantage in that the increase of the current intensity does not risk being limited by saturation of these materials.

In the preferred embodiments of the invention, where the stator comprises two rings surrounding the rotor, the self-exciting laminated structure is obtained by means of cylindrical grooves having in transverse section the general shape of spiral segments.

In order to avoid Joule effect losses in the immediate vicinity of the gap, it is advantageous to stop the lamination of the stator at a small distance of the gap so that the portion of the stator contiguous to the gap is left solid over a small thickness, as it will be hereinafter explained.

For the same purpose, it may be of interst to curve the gap so as to make at least one annular slice thereof tangent at every point thereof to the line of force of the magnetic field that passes at this point.

Means are further provided for gradually driving the rotor at high speeds, and means for electrically blocking the rotor thus driven, in such manner as to transform its kinetic energy into electric energy.

Said last mentioned means act by injection, simultaneously into all the gaps, of an electricity conducting liquid such as mercury, an indium and mercury alloy, sodium, potassium, a sodium and potassium alloy and so on.

In order to obtain a correct filling of the gaps, the pressure under which this injection takes place must be higher than the sum of the magnetic and possibly centrifugal pressures acting upon the injected liquid. For this purpose, it may be advantageous to provide special means for throttling the supply of conductor liquid downstream of the gaps.

In order to ensure a quick injection, it is advantageous to make use of a valve of the quickly opening type adapted to place the gaps instantaneously in communication with a tank where the conductor liquid is under pressure.

In order to reduce the drawbacks due to the centrifugal force, it is advantageous to dispose the gaps parallel to the axis of rotation.

The electric current that is obtained may be dissipated in the stator itself, the intensive field that is produced for an instant being then exploited on the spot, for instance to produce a plasma along the median line of the stator, if this stator is in the form of a hollow ring.

But this current may also be collected between special terminals and used in an external circuit.

FIGS. 1 to 3 show an intensive current generator adapted to be used in the first manner above described.

The rotor 1 of this machine essentially comprises a cylindrical ring 2, made of copper, relatively thick and heavy, mounted on a rotating shaft 3.

Stator 4 surrounds rotor 1 and essentially comprises a mass of copper in the form of a body of revolution comprising the following portions:

(a) two cylindrical elements 5 forming axial extensions of cylindrical ring 2 on either side thereof, these elements 5 having the same cross section as said cylindrical ring 2;

(b) two disc portions 6 rigid with the ends of elements 5 and extending outwardly from said elements 5; and (c) a cylindrical sleeve 7 extending between the external edges of disc portions 6.

The mass of the stator therefore has in axial half section the shape of a C extending on either side of the rotor, from which it is separated by gaps 8.

The stator is laminated so as to compel the current to flow therethrough along paths other than purely radial or axial paths whereby there are created in the stator current components perpendicular to the axis of the rotor but which do not intersect this axis, the resultant of these components exerting a torque on the rotor instead of exerting only purely radial forces. The purpose of this torque will be explained hereinafter.

The laminated arrangement is clearly visible on FIGS. 1 to 3. This laminated arrangement is symmetrical with respect to the middle transverse plane of the stator and, for each of the stator halves, which are symmetrical with respect to this plane, it may be considered as obtained by cutting the stator along planes inclined with respect to the axis of the rotor at an angle ranging from 30° to 60°.

The intervals 9 between the laminated portions may be filled with air or any other desired insulating substance.

In FIGS. 1 to 3 the lines provided with arrows indicate the path of travel of the current in the stator and in the rotor. The circles containing a point designate a displacement toward the space above the plane of the drawings and the circles containing a cross designate on the contrary a displacement toward the space below this plane.

It will be seen that the current flows axially through the rotor and in the middle zone of sleeve 7, radially in the disc portions 6 and in oblique directions in parts 5 and in the marginal areas of sleeve 7.

Every closed loop corresponding to a mean current line may be decomposed into:

A ring wholly contained in an axial plane of the machine, this ring comprising the radial and axial segments of said loop and the axial components of its oblique segments; and Four segments perpendicular to said axial plane, these segments representing the oblique segment components perpendicular to this plane.

The lines of force of the magnetic field produced by all the currents circulating through the above stated rings are circles having their centers located on the axis of the machine. The forces exerted by this field on the axial currents flowing through the rotor are therefore directed radially and exert no torque on the rotor.

On the contrary, the lines of force of the magnetic field produced by the currents flowing through the two of the four above mentioned perpendicular segments that are at the smaller distance from the axis are directed radially and added to each other on the rotor. This field therefore exerts a torque on said rotor.

The field due to the currents in the two other above mentioned perpendicular segments may be neglected in a first approximation.

The above mentioned torque therefore corresponds to the mechanical action of the currents of the stator on the rotor and it is through this torque that the kinetic energy of the rotor is transformed into electrical energy.

The operation of this machine is as follows:

The rotor is first driven at high speed by means of a motor (not shown) mounted on shaft 3;

The machine being mounted as a series dynamo (self-excitation), it is known that as soon as the rotor speed exceeds a given critical value, a very small current or a very small external magnetic field is sufficient to start the normal electric current pulse.

If the conductor masses of the stator comprise a small proportion of ferro-magnetic material, the remanent magnetism of this material is sufficient to start the pulse. But in the preferred embodiment of the invention, whereas said masses do not comprise iron, it is preferable to create the small field necessary for starting by means of a special coil (not shown). This arrangement makes it possible to control at will the direction of the intensive current pulse created in the machine.

When the speed of the rotor is sufficient, mercury is suddenly injected into gaps 8 so as to fill them. The ring 2 of the rotor is thus electrically connected with the conducting mass of the stator. The electromotive force produced by the rotation of the rotor in the excitation field then starts in the machine a current which increases the excitation field and exerts a braking torque on the rotor. The reaction is cumulative and within a very short time, which generally corresponds to a portion of a second, the intensity of the current created in the machine takes a very high value then drops to zero, whereas the speed of the rotor decreases, becomes zero and may even be reversed in some cases.

To sum up, if the heat losses due to the Joule effect are neglected, it may be said that, since the total energy remains constant, the kinetic energy of the rotor has been transformed into electrical energy.

It should be noted that the self-exciting arrangement makes it possible to create said intensive electrical energy from a relatively weak power source (that of the motor which drives the rotor) whereas a separate excitation arrangement would require transferring nearly instantaneously from the outside of the machine a magnetic field of the same order of magnitude as that released by this machine.

The diagram of FIG. 4 shows, as a function of the time plotted in abscissas, on the one hand, at the top, the variations of the speed V of rotation of the rotor and on the other hand, at the bottom, those of the intensity $i$ of the current circulating in the rotor-stator short-circuit loop.

Curves $a$ relate to the theoretical results deduced from calculation (the critical speed being supposed to be very low and the friction of mercury on the contacts being supposed to be negligible) and curves $b$ illustrate the experimental results measured when the machine is effectively in operation.

The origin of times is supposed to be the beginning of injection of mercury.

As it will be seen, theoretically, the speed of the rotor decreases, becomes zero after a relatively short time (ranging for instance from $\frac{1}{100}$ and $\frac{1}{10}$ of a second for an initial speed of 10,000 revolutions per minute) then is reversed. Theoretically also the current intensity increases from a low initial value $i_0$ produced for instance by a starting winding (not shown), passes through a maximum at time T and then decreases.

With a small experimental machine, according to the results observed, the rotor was driven gradually up to a speed of 10,000 revolutions per minute by means of a small motor of ½ H.P. which made it possible to store up a kinetic energy of 15 kilojoules.

When said speed was reached (after about 3 minutes) mercury was injected into the gaps, of a thickness of about 2 mm., from a chamber of a volume of about 1 liter, under a pressure of about 7 kgs./cm.$^2$.

It was found that the rotor was considerably slowed down during a portion of a second following the injection of mercury but that it was stopped completely only after six seconds, without its direction of rotation being reversed.

Furthermore the intensity of the current obtained reached more quickly than foreseen a maximum value of 500,000 amperes under a voltage of about 1 volt and it dropped to zero after $3/10$ of a second.

This very high current intensity creates a very intensive field (ranging from 15,000 to 20,000 gauss) in the annular space limited by the conductor masses of the rotor and of the stator.

This field might be used on the spot to create a plasma along the mean line shown at 10 on FIG. 1, after having of course completed the fluidtightness of this space and adapted it to this particular function.

But in the embodiments which will now be described with reference to FIGS. 5 to 16 the stator is not closed upon itself but it is connected to external terminals making it possible to make use on the outside of the machine of the very high current it produces.

In a first embodiment of this type of machine, illustrated by FIGS. 5 to 8, the machine comprises two rotors disposed symmetrically of each other with respect to a transverse plane and driven respectively in two opposed directions so that the torques exerted on the stator balance each other when the liquid is injected.

Each of these rotors, mounted on a shaft 3, comprises an annular mass 11 of high inertia and a mass 12 of revolution made of copper and the outer and inner surfaces of which are cylindrical.

A stator, common to both of said rotors, essentially comprises three masses of copper in the form of bodies of revolution, to wit an inner one 13 and two outer ones 14.

Mass 13 has two external cylindrical areas located opposite the inner cylindrical faces of the rotor masses 12.

Masses 14 are in the form of rings symmetrical of each other with respect to the middle transverse plane of the whole and each of them has its inner surfaces located opposite the outer cylindrical faces of the rotor masses 12, respectively.

Stator masses 14 are laminated so as to obtain a self-excitation machine as above supposed.

For this purpose said masses 14 consist of copper sheets which are curved and juxtaposed after interposition between them of insulating layers 15, as shown by FIG. 5.

The whole periphery of each fixed mass 14 is connected through a set of plates 16 with a common terminal (not shown), the plates of each set being of course electrically insulated from those of the other set. The external circuit provided between these two terminals must of course have an impedance sufficient for dissipation of heat.

As further shown by FIG. 5, pipes 17 and 18 are provided respectively for the inflow and outflow of the electricity conducting liquid, as indicated by the arrows.

It will be noted that, as the gaps are cylindrical, the disturbing effects exerted by the centrifugal force on mercury are practically eliminated, which permits a correct filling of these gaps.

Reference numeral 19 designates the windings that serve to the initial energizing of the machine.

In order to prevent the two rotors from having a tendency to move axially away from each other, it is advantageous to laminate rotor masses 12 in such manner as to give each of them the shape of a strip which is spiral wound on itself or at least of a piling of scales the middle lines of which have at every point a trangential component.

As a matter of fact, the path followed by the electric current through masses 12, 13 and 14 (and through the external circuit diagrammatically shown at 20 in FIG. 7) produces axial and radial components 21 which create a magnetic field H, the lines of force of which are circles having their respective centers on the axis of the machine. This magnetic field exerts, on the radial currents circulating in rotor masses 12, forces the axial components $f$ of which tend to move said masses away from each other.

Now, the energizing field due to the tangential current components I (FIG. 8) created by the laminated structure of masses 14 has lines of force curved in the manner illustrated at 22 in FIG. 8. At the level of every rotor mass 12, these lines are slightly inclined with respect to the axis of the machine. They therefore exert upon the tangential components J of the current flowing through said masses 12 (due to said laminated structure) forces F slightly inclined with respect to a transverse plane. The machine may be constructed in such manner that the axial components of all these forces F exactly balance the above mentioned forces $f$. It should be noted that the balancing that is obtained is stable for all values of the current intensity since forces $f$ and F are both directly proportional thereto.

The machine which has just been described has in particular the following advantages over that described with reference to FIGS. 1 to 3:

Since the two rotors rotate in opposed directions, respectively, the reaction torques exerted on the external supports practically balance each other;

The same applies to the axial efforts exerted on the rotors provided that the rotor masses are laminated as above explained;

The stator is no longer enveloping so that the rotors may easily comprise masses of great inertia;

The absence of centrifugal force in the gaps facilitates the injection of mercury;

The escape of mercury is facilitated due to the fact of its tangential direction; and The construction by piling on one another the curved sheets is greatly simplified.

In the preferred embodiment, illustrated by FIGS. 9 to 16, the machine comprises the following elements:

A rotor consisting on the one hand of a fly-wheel 23 (FIG. 9) having a great moment of inertia and carried by a shaft 25 having a cylindrical portion 53 (FIGS. 9 and 10) of large diameter, in order to increase the mechanical resistance, and on the other hand of a cylindrical sleeve 24 made of a material which is a good conductor of electricity, such as copper, mounted on the shaft portion 53 of large diameter; and A stator consisting chiefly of two rings 26 and 27, the inner surfaces of which are cylindrical and surround each, with a small play or gap 28, one of the axial ends of sleeve 24.

Sleeve 24 and the portion of large diameter 53 of shaft 25 may be made in a single unit of a material which is both a good conductor of electricity and a mechanically resistant substance, such as beryllium bronze.

Rings 26 and 27 are provided with cylindrical slots 29 having in cross section the shape of portions of spirals. The external portions of these rings are connected through parts 30 with thin transverse plates 31 located on opposite sides respectively of the middle transverse plane of the stator. Said plates are electrically insulated from each other and connected to an external utilization circuit diagrammatically represented by resistor 32 in FIG. 9. Plates 21 must be thin in order to avoid as much as possible the reaction of disymmetrical radial stresses on the rotor due to the currents of high intensity circulating through the plates.

Connection of said plates with the external circuit may be for instance obtained by means of a mercury joint 33

(FIG. 9), on account of the very high intensity of the current brought into play.

As soon as the injection of mercury along arrows 34 into gaps 28 has closed the electric circuit 24–27–30–31–32–31–30–26–24, a weak energizing field (created for instance by a special coil, not shown, or by the remanence of the iron material that may be present in the machine) starts a current illustrated by path 35.

The flow of this current through the laminated portions of rings 26 and 27 produces tangential currents represented by the circles of FIG. 9, the circles containing a point designating displacements toward the space above the plane of the drawing and those containing a cross designating displacements toward the space below this plane.

These tangential currents create a magnetic field having an important radial component which reinforces the starting current, and so on.

Rotation of the rotor in the high intensity field thus created by cumulative effect produces between the gaps an electromotive force (for instance averaging 50 volts) capable of creating in the above mentioned closed circuit a current of considerable intensity (averaging for instance two millions of amperes).

The arrangement above described has the advantage of producing no axial effort of electrical origin on the rotor and of avoiding the effects of the centrifugal force on the mercury circulating through the gaps.

Furthermore the circuit of the conductor liquid is much simpler in this case than that of FIGS. 5 and 6.

According to an advantageous feature of the invention, the laminated slots of the stator do not extend as far as the gaps. In other words, there is provided between the gap and the laminated portion of the stator a solid portion the function of which will be explained with reference to FIGS. 11 to 14.

These figures show three electricity conductive elements consisting, respectively, of a solid piece 36, a laminated piece 37 separated from piece 36 by a cylindrical annular interval 38 and a mass of liquid filling said interval. A portion of these elements has been shown in side view by FIGS. 11 and 13 and in axial view by FIGS. 12 and 14, which are sections on the line XII—XII of FIG. 11 and XIV—XIV of FIG. 13, respectively.

The embodiment of FIGS. 11 and 12 differs from that of FIGS. 13 and 14 merely in that the lamination extends as far as the gap in the first case and stops short of said gap in the second case.

It will be supposed that piece 36 (rotor) is given a movement of rotation in the direction of arrow 39 with respect to piece 37 (stator) and that a magnetic field of low value, illustrated by arrows 40 (FIGS. 12 and 14) is produced radially at a point A of gap 38.

This field creates between points B and C located on either side of point A an electromotive force directed from B toward C.

This force creates, in the different layers of the laminated structure of FIGS. 11–12, currents represented by arrows 41 which comprise tangential components the directions of which are indicated by circles 42. These current components in turn create a magnetic field which reinforces the initial field. The structure therefore corresponds to that of a self-excited elementary dynamo where important Joule losses take place, which uselessly heat the pieces.

In the construction of FIGS. 13 and 14, currents of the type shown by arrows 41 cannot take place since they are directly short-circuited by the solid portion 44, as illustrated by arrow 43.

This structure thus permits of eliminating the Joule losses above referred to.

It further permits of reducing the radial mechanical stresses due to disymmetry of distribution of the currents in plates 31.

Figure 10:
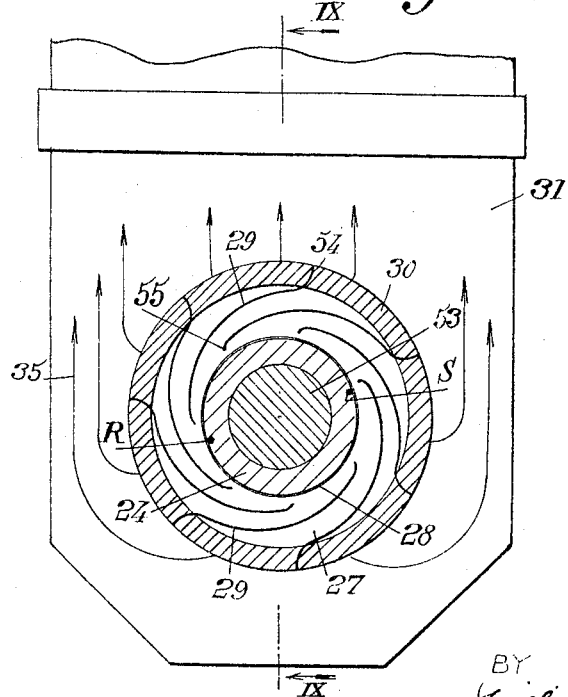
FIG. 10 is a cross sectional view on the line X—X of FIG. 9.

As a matter of fact, this disymmetry produces unequal values of the potentials in two diametrally opposite zones of the rotor such as indicated by points R and S in FIG. 10. This potential difference creates in the rotor currents circulating from one of said zones toward the other, which currents may produce important radial stresses. The arrangement of FIG. 14 eliminates this drawback.

Another feature of the invention will now be described with reference to FIGS. 15 and 16 so as also to reduce the Joule effect losses.

It will be supposed in FIG. 16 that the annular interval 28 between rotor 24 (which moves in the direction of arrow 45) and stator portion 26 is exactly cylindrical and that the magnetic field created at a point D of this gap by the tangential components of the current is not purely axial, that is to say has a normal component N.

The relative displacement of pieces 24 and 26 in field N produces induced currents illustrated by arrows 46, which currents are capable of producing considerable Joule losses (as above explained with reference to FIGS. 11 and 12).

In order to avoid these losses, it suffices to give the opposite surfaces of pieces 24 and 26 a curvature such that the induction magnetic field illustrated by arrows 47 (FIG. 15) is tangent at every point to said surfaces, so that the component N thereof perpendicular to these surfaces is reduced to zero.

Such an arrangement is illustrated at 48 in FIG. 15.

As shown by said FIG. 15 the curved zone 48 of the gap does not extend over the whole axial length thereof, this in order to have the height of said curved zone smaller than the radial thickness of the gap, whereby the rotor may be mounted in the stator by mere axial introduction.

Referring to FIG. 15, another feature of the invention will further be described.

At point M located at the middle point of the axial length of the gap, the magnetic field comprises two components, to wit an axial one illustrated by arrow 49 and a tangential one illustrated by circle 50.

The driving electric forces applied to the mercury or other electricity conducting liquid at said point M can also be reduced to two components, an axial one proportional to the tangential field 50 and a tangential one proportional to the axial field 49.

The first one produces in the liquid a high pressure, averaging some tens of megapascals, which has a tendency to drive said liquid axially to the outside of the gap.

The second force component applies to the liquid a tangential impulse inversely proportional to the axial circulation velocity thereof, which impulse produces a useless loss of energy.

In order to reduce this impulse, it is therefore advantageous to increase the axial velocity.

But on the other hand, the pressure of the liquid in the gap must be sufficient to ensure a permanent filling thereof.

It is therefore necessary to choose a compromise between the flow rate and the pressure of the electricity conductive liquid in the gap.

For this purpose, there is created at the outlet 51 of the gap a throttling, of fixed or adjustable area, for instance by mounting on the stator an annular element 52 which surrounds with the desired play the corresponding axial end of the rotor.

This throttling, which is preferably adjustable, must be both below a given upper limit (depending in particular upon the inlet pressure of the electricity conducting liquid and upon the expelling electric pressure of this liquid), above which the filling of the gap would be insufficient, and above a given lower limit so that the axial circulation velocity of the liquid in the gap is important and therefore the above mentioned tangential impulse is low.

This throttling permits of limiting the flow rate of electricity conducting liquid to a minimum compatible with an acceptable tangential effort on this liquid.

Slots 29 are preferably cut in the stator mass by electro-erosion.

Preferably they are:

Extended, as visible at 54 in FIG. 10, as far as the periphery of rings 26 and 27 so as to avoid the creation of supplementary radial stresses due to anisotropic tangential currents which otherwise would circulate in half ring 30; and Curved toward the radial direction at their inner ends (as visible at 55 in FIG. 10) in order to avoid local current accumulation.

A machine such as above described has many advantages over those existing at the present time (which work in particular by the discharge of a capacitor) in particular in that it produces current of an intensity at least as high but during longer periods of time (which may in some cases reach and even exceed one second) and this in a particularly simple manner.

Of course, the system formed by the combination of a mass or large inertia rigid with the rotor with a motor for driving said mass might be replaced by any other system capable of gradually storing up an important energy and of suddenly restoring it, for instance by the combination of a compressor capable of compressing a fluid in a closed vessel and of a turbine rigid with the rotor and into which said fluid would be suddenly released at the end of compression, the injection of conductor fluid taking for instance place at the time when the turbine reaches its maximum speed.

In a general manner, while the above description discloses what are deemed to be practical and efficient embodiments of the invention, said invention is not limited thereto as there might be changes made in the arrangement, disposition and form of the parts without departing from the principle of the invention as comprehended within the scope of the appended claims.

What I claim is:

1. A machine for generating high intensity electric surges which comprises, in combination, a high inertia rotor including an electricity conducting mass, said electricity conducting mass having two surfaces of revolution about the axis of said rotor, a stator comprising an electricity conducting mass shaped to have two surfaces of revolution each opposite one of said surfaces of revolution of said rotor, respectively, each of said stator surfaces being separated from the corresponding rotor surface located opposite it by a narrow gap, said electricity conducting mass of said stator being laminated by means of cuts provided therein so as to form slices between said cuts, means for gradually driving said rotor up to a high speed of revolution and means for injecting an electricity conducting liquid into said gaps when said rotor is rotating freely at said high speed, said cuts being shaped to produce in every slice, when the rotor is rotating, in response to the passage of current through said stator mass, a force having a component perpendicular to the axis of said rotor and passing at a distance therefrom, which exerts a braking torque on said rotor.

2. A machine according to claim 1 wherein said gaps are parallel to said axis.

3. A machine according to claim 1 wherein said electricity conducting masses of said rotor and said stator are made of a magnetic material.

4. A machine according to claim 1 wherein said rotor consists of two halves mounted symmetrically of each other with respect to a transverse plane and adapted to rotate in respective opposed directions.

5. A machine according to claim 4 wherein said stator comprises a solid central portion and two annular portions coaxially surrounding it.

6. A machine according to claim 4 wherein said rotor electricity conducting mass is laminated in such manner that the mean line of each of the laminations thereof presents at every point thereof a tangential component.

7. The method of creating an electric current of very high intensity by means of a machine according to claim 1 which method comprises gradually driving the rotor of said machine at high speed, then allowing it to rotate freely while injecting an electricity conducting liquid simultaneously in said gaps, thus short-circuiting the electricity conducting masses of the stator and of the rotor and transforming the kinetic energy stored up in the rotor into an electric current impulse of very high intensity flowing through the circuit constituted by the whole of the electricity conducting masses of the rotor and of the stator.

8. A method according to claim 7 wherein the gaps are throttled at the outflow thereof so as to produce therein a pressure of the conductor liquid ensuring a good electric contact between the stator and the rotor, the rotor being made of copper.

9. A machine for generating high intensity electric surges which comprises, in combination, a rotor, said rotor comprising a high inertia mass and an electricity conducting sleeve having two surfaces of revolution about the axis of said rotor, a stator comprising an electricity conducting mass shaped to have two rings of revolution about said axis, each coaxially surrounding one end of said sleeve, respectively, with a narrow gap between each of said rings and the sleeve end it surrounds, each of said rings being laminated so that the machine is a self-exciting one, the laminating of said rings consisting in the provision therein of cuts in the form of cylindrical surfaces having their generatrices parallel to the axis of said rotor and the transverse sections of which by planes perpendicular to said axis are spiral-shaped, whereby slices are formed between said cuts, means for gradually rotating said rotor at high speed and means for injecting a conductor liquid into said gaps in such manner as to connect in series the conducting masses of said stator and of said rotor.

10. A machine according to claim 9 further comprising a shaft rigid with said high inertia mass, said sleeve being rigid with said shaft.

11. A machine according to claim 9 further comprising a shaft rigid with said high inertia mass, said sleeve being integral with said shaft.

12. A machine according to claim 9 further comprising a shaft rigid with said high inertia mass, said sleeve being integral with said shaft, said electricity conducting masses of said rotor and said stator being made of a magnetic material, said rotor being made of beryllium bronze.

13. A machine according to claim 9 further comprising two thin plates electrically insulated from each other and each connected to one of said rings, respectively, said plates extending transversely to said sleeve and on opposed sides of the middle transverse plane thereof.

14. A machine according to claim 9 further comprising two thin plates electrically insulated from each other and each connected to one of said rings, respectively, said plates extending transversely to said sleeve and on opposed sides of the middle transverse plane thereof, an external utilization circuit, and mercury joint means for connecting the ends of said circuit to said plates, respectively.

15. A machine according to claim 9 wherein the portions of said stator contiguous to each of said gaps are solid over a small distance from said gap.

16. A machine according to claim 15 wherein the ends of the cuts nearest to said gaps are curved into radial direction.

17. A machine according to claim 9 wherein the said cuts extend as far as the external periphery of said rings.

18. A machine according to claim 9 wherein at least a portion of said gap has curved generatrices so that said gap portion is tangent to the lines of force of the magnetic field produced in said gap portion by the currents circulating through said slices.

19. A machine according to claim 18 wherein said curved portion extends over only a portion of the axial length of said gap.

20. A machine according to claim 9 further comprising means for throttling the flow of said conductor liquid downstream of each of said gaps so as to produce in said gaps a pressure of said liquid ensuring a good electric contact between the stator and the rotor.

References Cited by the Examiner
UNITED STATES PATENTS
2,786,155   3/1957   Sellers _____ 310—178

MAX L. LEVY, *Primary Examiner.*
DAVID X. SLINEY, *Examiner.*